May 19, 1925.
W. B. EBERLY
1,538,101
ARMREST
Filed June 20, 1924
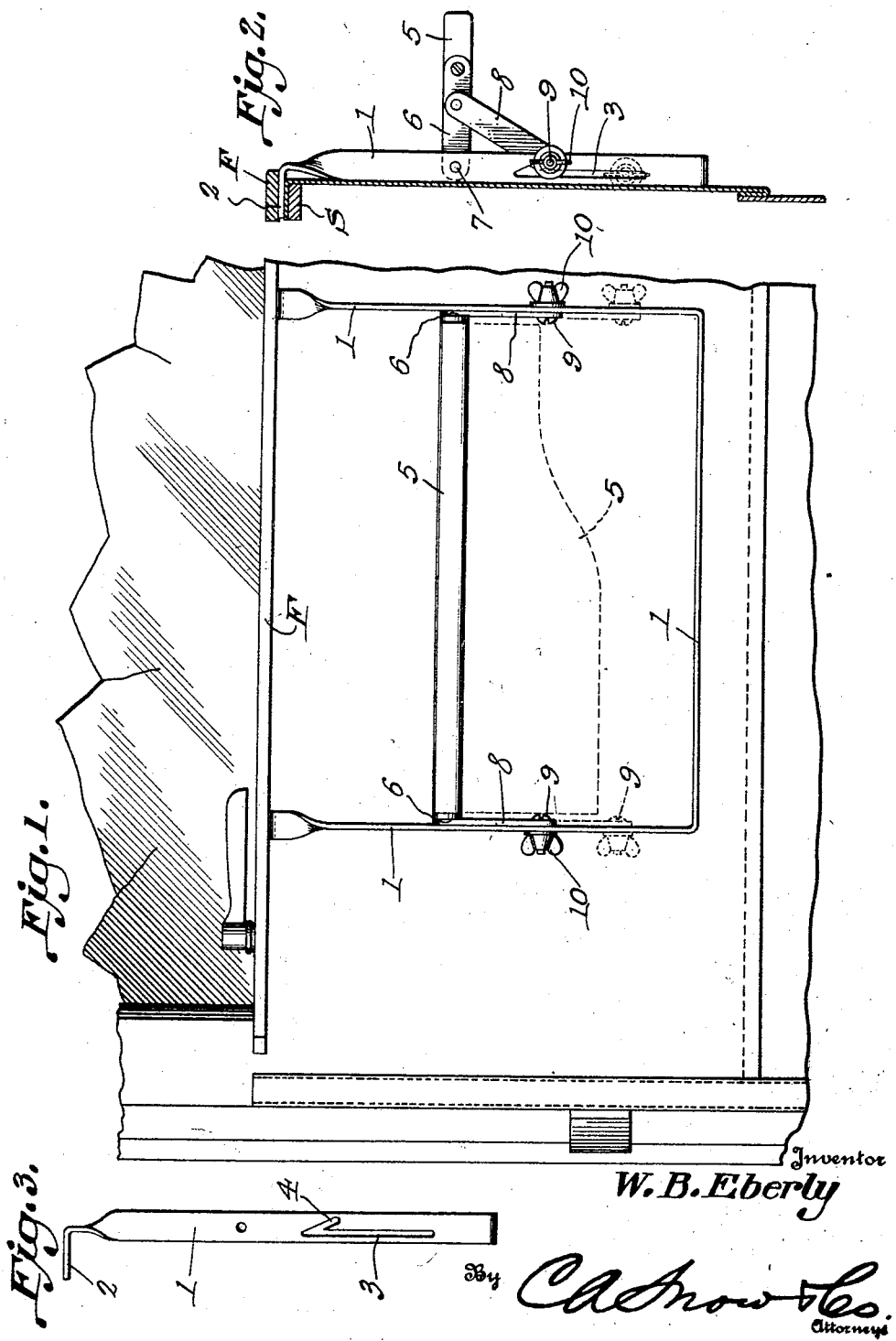
Inventor
W. B. Eberly Patented May 19, 1925.

1,538,101

UNITED STATES PATENT OFFICE.

WEIR B. EBERLY, OF MECHANICSBURG, PENNSYLVANIA.

ARMREST.

Application filed June 20, 1924. Serial No. 721,333.

*To all whom it may concern:*

Be it known that I, WEIR B. EBERLY, a citizen of the United States, residing at Mechanicsburg, in the county of Cumberland and State of Pennsylvania, have invented a new and useful Armrest, of which the following is a specification.

This invention relates to an arm rest, and although it can be used in connection with different kinds of seats, it is designed primarily for use beside the driver's seat of a motor vehicle.

Heretofore it has been the practice of the driver of a motor vehicle to place the elbow of the left arm on the sill of the adjacent window but this posture has been uncomfortable because of the height of the sill. In an effort to overcome this objection, narrow fixed arm rests have been provided below the window sills but these have been objectionable because they crowd the occupant of the seat when it is not desired to use the arm rest, as for example, when two or more persons are occupying the seat.

It is an object of the present invention to provide an arm rest which will constitute a comfortable support for the left arm of the driver but which, when not in use, can be easily folded out of the way so as not to crowd the occupants of the seat or cause discomfort.

Another object is to provide an arm rest which when not in proper position is located below the sill of the window at the proper height to hold the arm comfortable.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1 is an elevation showing the arm rest of a vehicle structure, said structure being broken away and one position of the arm rest being shown indicated by broken lines.

Fig. 2 is an end view of the arm rest, the adjacent portion of the vehicle structure being in section.

Fig. 3 is an end view of the supporting frame of the arm rest.

Referring to the figures by characters of reference 1 designates the supporting frame of the arm rest, the ends of this frame being formed preferably of parallel arms, the upper ends of which are extended laterally to provide supporting ears 2 adapted to be fastened upon the sill S of the vehicle window or other supporting structure, there being preferably a finishing strip F extended over the ears. The frame 1 can be formed of a single length of metal bent to proper shape as shown. Each of the arms or end portions of the frame 1 is provided with a longitudinal slot 3 and the slot in one of these arms can be provided at its upper end, with a downwardly inclined extension 4, forming a seat as hereinafter explained.

Arranged between the arms or ends of the frame 1 is a strip 5 constituting the arm rest per se, there being strips 6 fastened to the ends of this rest and pivotally connected at 7 to the arms of the frame. Links 8 are pivotally attached to strips 6 and each of them carries a screw 9 adapted to slide within one of the slots 3. Each screw preferably carries a wing nut 10 which, when tightened, will clamp link 8 against the arm of the supporting frame so as to hold the link against movement.

Under normal conditions the arm rest 5 hangs downwardly within the frame 1 as shown by broken lines in Fig. 1. At this time the screws 9 are located in the lower end portions of the slots 3. When it is desired to use the arm rest, the same is pulled upwardly so as to bring the screws 9 against the upper ends of the slots 3. During this upward movement, the screw 9 in one of the slots will be pulled forwardly by the link 8 to which it is connected so as to be supported within the upper end of notch or extension 4. Thus when the arm rest is thrown downwardly one of the screws 9 will enter the extension 4 and be supported by the end wall of the extension as shown in Fig. 2. Consequently the rest 5 will be held in operative position. The nuts 10 can be tightened to hold the arm rest against vibration or accidental displacement.

Frame 1 will support the arm rest below the window sills where the arm of the driver can be comfortably positioned.

Should it be desired to fold the arm rest so that it will be out of the way, it becomes merely necessary to press upwardly and backwardly on the link 8 carrying screw 7 which is seated in extension 4. Thus said screw will be pushed upwardly out of the extension and by then swinging the rest 5 downwardly, the parts will be brought to collapsed position as shown by broken lines in the drawing. It is to be understood that the extension 4 is preferably provided in connection with only one of the slots 3, although, if desired, such an extension could be provided with both slots.

While this arm rest is designed primarily for use by the driver of a motor vehicle, it is to be understood that similar arm rests can be located for use by other persons riding in the vehicle.

The thumb nuts or other devices used for binding the link 8 to the sides of the frame 1 are important because they prevent the objectionable noise that would otherwise be due to vibration.

What is claimed is:—

1. A device for attachment to the window sill of a motor vehicle, including a frame having outturned end portions for extension over and adapted to clamp upon the sill, there being longitudinal slots in the side portions of the frame, each slot having a downwardly inclined extension at its upper end, an arm rest extending between and pivotally connected to the sides of the frame and adapted to fold downwardly between said sides and flush therewith, links pivotally connected to the arm rest and extending between the sides of the frame, and means carried by the links and slidably mounted within the respective slots for entering the extension to support the arm rest in active position, said links being movable to position between the arm rest and sides of the frame when the arm rest is folded downwardly within the frame.

2. The combination with the window sill of a motor vehicle and a finishing strip mounted thereon, of a frame having outturned terminals clamped between and concealed by the window sill of the finishing strip, an arm rest pivotally mounted between the sides of the frame and foldable downwardly between said ends and substantially flush therewith, each of said ends having a longitudinal slot provided, at its upper end, with a downwardly inclined extension, links pivotally connected to the ends of the arm rest, and clamping means carried by the links and slidable within the slot, said means being movable downwardly within the extension to support the arm rest in active position, said links being movable downwardly to position between the sides of the frame and the ends of the arm rest when said arm rest is folded into the frame.

In testimony that I claim the foregoing as my own, I have hereto affixed my signature in the presence of two witnesses.

WEIR B. EBERLY.

Witnesses:
C. I. SWARTZ,
G. L. STROCK.